(12) United States Patent
Liao et al.

(10) Patent No.: US 12,468,612 B2
(45) Date of Patent: *Nov. 11, 2025

(54) CREATING METHOD OF A CLASSIFICATION MODEL ABOUT HARD DISK EFFICIENCY PROBLEM, ANALYSIS METHOD OF HARD DISK EFFICIENCY PROBLEM AND CLASSIFICATION MODEL CREATING SYSTEM ABOUT HARD DISK EFFICIENCY PROBLEM

(71) Applicants: Inventec (Pudong) Technology Corporation, Shanghai (CN); INVENTEC CORPORATION, Taipei (TW)

(72) Inventors: Yi-Ju Liao, Taipei (TW); Jen-Yuan Chang, Taipei (TW); Po-Hsiu Chen, Taipei (TW); Hsieh-Liang Tsai, Taipei (TW)

(73) Assignees: INVENTEC (PUDONG) TECHNOLOGY CORPORATION, Shanghai (CN); INVENTEC CORPORATION, Taipei (TW)

( * ) Notice: Subject to any disclaimer, the term of this patent is extended or adjusted under 35 U.S.C. 154(b) by 802 days.

This patent is subject to a terminal disclaimer.

(21) Appl. No.: 17/840,774

(22) Filed: Jun. 15, 2022

(65) Prior Publication Data
US 2023/0281093 A1 Sep. 7, 2023

(30) Foreign Application Priority Data
Mar. 1, 2022 (CN) .......................... 202210194415.1

(51) Int. Cl.
*G06F 11/30* (2006.01)
*G06F 3/0346* (2013.01)
(Continued)

(52) U.S. Cl.
CPC ........ *G06F 11/3058* (2013.01); *G06F 3/0346* (2013.01); *G06F 11/3409* (2013.01); *G06F 18/23213* (2023.01); *G06N 5/01* (2023.01)

(58) Field of Classification Search
CPC ............. G06N 20/00; G06N 3/08; G06N 7/01
See application file for complete search history.

(56) References Cited

U.S. PATENT DOCUMENTS

| | | | |
|---|---|---|---|
| 6,473,263 B2 * | 10/2002 | Jang ........................ | G11B 33/08 360/99.18 |
| 2008/0253015 A1 * | 10/2008 | Harrington .......... | G11B 19/042 360/75 |

(Continued)

FOREIGN PATENT DOCUMENTS

WO WO-2017129030 A1 * 8/2017 ............. G06F 11/22

OTHER PUBLICATIONS

"Continuous Attribute Discretization Algorithm of Rough Set Based on K-means" 2014 IEEE Workshop on Advanced Research and Technology in Industry Applications (WARTIA) Xing Xiaoxue1,2, Guan Xiuli2, Shang Weiwei2 (Year: 2014).*

(Continued)

*Primary Examiner* — Luis A Sitiriche
(74) *Attorney, Agent, or Firm* — troutman pepper locke; Tim Tingkang Xia, Esq.

(57) ABSTRACT

A creating method of a classification model about a hard disk efficiency problem comprising: by an analyzing device, performing: obtaining a plurality of pieces of measurement data of a plurality of hard disk devices each of which comprises a plurality of values of a plurality of vibration parameters; discretizing the plurality of pieces of measurement data based on a k-means algorithm; and obtaining the classification model about the hard disk efficiency problem (Continued)

based on the plurality of pieces of discretized measurement data and a decision tree algorithm.

11 Claims, 4 Drawing Sheets

(51) Int. Cl.
*G06F 11/34* (2006.01)
*G06F 18/23213* (2023.01)
*G06N 5/01* (2023.01)

(56) References Cited

U.S. PATENT DOCUMENTS

| | | | | |
|---|---|---|---|---|
| 2010/0064809 | A1* | 3/2010 | Toga | G11B 19/042 |
| | | | | 73/514.34 |
| 2018/0322430 | A1* | 11/2018 | Guha | G06Q 10/06316 |
| 2022/0012153 | A1* | 1/2022 | Carey | G06F 11/3089 |
| 2022/0019495 | A1* | 1/2022 | Lavi | G06N 20/20 |

OTHER PUBLICATIONS

"Prediction of Line Fault Based on Optimized Decision Tree" 2018 International Conference on Computer Modeling, Simulation and Algorithm (CMSA 2018) Jianping Yang2, Jingxian Qi1,*, Kang Ye2 and Youlin Hu2 1Nari Group Corporation State Grid Electric Power Research Institute, Nanjing, China (Year: 2018).*
WO-2017129030-A1 English Translation Copy (Year: 2017).*

* cited by examiner

CREATING METHOD OF A CLASSIFICATION MODEL ABOUT HARD DISK EFFICIENCY PROBLEM, ANALYSIS METHOD OF HARD DISK EFFICIENCY PROBLEM AND CLASSIFICATION MODEL CREATING SYSTEM ABOUT HARD DISK EFFICIENCY PROBLEM

CROSS-REFERENCE TO RELATED APPLICATIONS

This non-provisional application claims priority under 35 U.S.C. § 119(a) on patent No(s). 202210194415.1 filed in China on Mar. 1, 2022, the entire contents of which are hereby incorporated by reference.

BACKGROUND

1. Technical Field

This disclosure relates to a creating method of a classification model, and particularly relates to a creating method of a classification model about a hard disk efficiency problem.

2. Related Art

As Internet rapidly develops, data processing amount is getting bigger and a needed number of servers is also getting bigger. When the server efficiency gets low, the data transmission of the Internet is affected and it would cause games to shut down, e-mail can't be sent normally or video conferencing is interrupted. How to improve the low server efficiency becomes an important issue.

Generally, the server efficiency relates to hard disk efficiency and the server is affected by the hard disk efficiency. If the hard disk efficiency gets low, the server efficiency gets low. Engineers usually find reason that causes the low hard disk efficiency inside the server by gradual manual analysis, but are unable to find the main reason which affects the hard disk efficiency and so are unable to effectively solve the problem of the low hard disk efficiency.

SUMMARY

In light of the aforementioned description, the present disclosure provides a creating method of a classification model about a hard disk efficiency problem, an analysis method of a hard disk efficiency problem and a classification model creating system about a hard disk efficiency problem to find the main reason which affects the hard disk efficiency.

According to one or more embodiments of the present disclosure, a creating method of a classification model about a hard disk efficiency problem including: by an analyzing device, performing: obtaining pieces of measurement data of hard disk devices each of which includes values of vibration parameters; discretizing the pieces of measurement data based on a k-means algorithm; and obtaining the classification model about the hard disk efficiency problem based on the pieces of discretized measurement data and a decision tree algorithm.

According to one or more embodiments of the present disclosure, an analysis method of a hard disk efficiency problem including: inputting, by a computer system, a piece of measurement data of an abnormal server hard disk to the aforementioned classification model about the hard disk efficiency problem created to obtain a classification result; wherein the classification result indicates an order of a plurality of problem factors which are associated with two or more of the plurality of vibration parameters.

According to one or more embodiments of the present disclosure, a classification model creating system about a hard disk efficiency problem includes vibration parameter sensors and an analyzing device. The vibration parameter sensors are configured to measure values of vibration parameters of each of hard disk devices. The analyzing device is connected to the vibration parameter sensors and is configured to obtain a plurality of pieces of measurement data of the plurality of hard disk devices, discretize these pieces of measurement data based on a k-means algorithm, and obtain the classification model about the hard disk efficiency problem based on the pieces of discretized measurement data and a decision tree algorithm, wherein each of the pieces of measurement data comprises the values of the vibration parameters corresponding to a respective one of the hard disk devices.

In view of the above description, the creating method of the classification model about the hard disk efficiency problem and the classification model creating system about the hard disk efficiency problem disclosed by the present disclosure utilizes the k-means algorithm to discretize the pieces of the vibration measurement data of the hard disk devices, and combines the pieces of the discretized vibration measurement data and the decision tree algorithm to be able to create the decision tree with high classification accuracy as the classification model about the hard disk efficiency problem. And, because the pieces of the vibration measurement data of the hard disk devices are served as training data, the pruning need of the decision tree created by the present disclosure isn't high. In addition, the analysis method of the hard disk efficiency problem disclosed by the present disclosure inputs the piece of the measurement data of the abnormal hard disk inside the server and storage system to the aforementioned classification model about the hard disk efficiency problem and is able to determine the main reason of the low hard disk efficiency very well.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown to simplify the drawings.

It is to be understood that although the terms 'first', 'second' and so on, may be used herein to describe various elements, components, regions and/or parts, these elements, components, regions and/or parts should not be limited by these terms. These terms are used only for the purpose of distinguishing one element, component, region and/or part from another element, component, region and/or part.

In addition, the terms "comprise" and/or "include" are referred to the existence of features, regions, structures, steps, operation and/or components, but are not to exclude the existence or adding of one or more of the other features, regions, structures, steps, operation, components and/or combination thereof.

Figure 1:
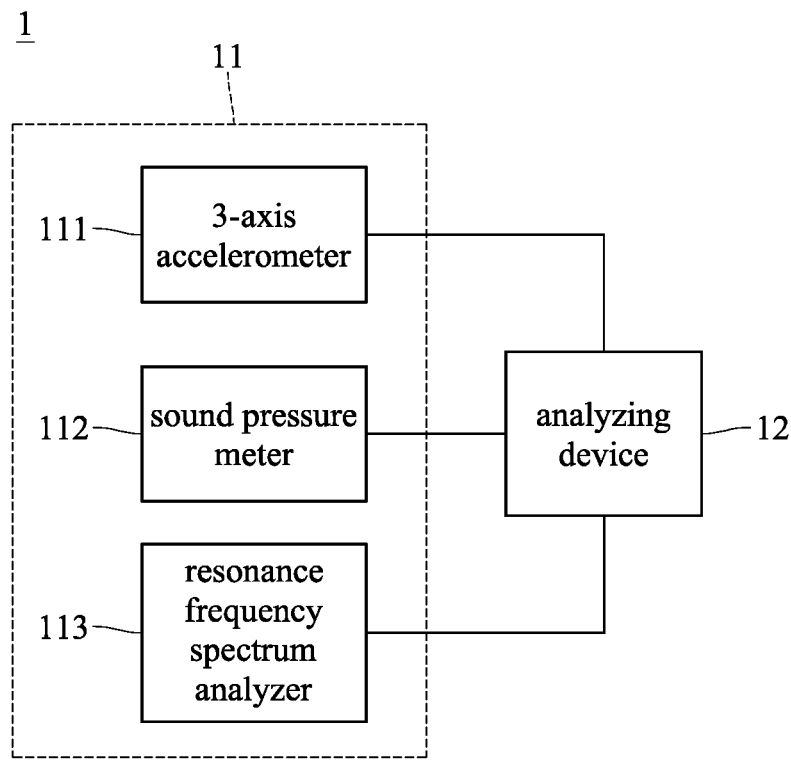
FIG. 1 illustrates a functional block diagram of a classification model creating system about a hard disk efficiency problem according to one embodiment of the present disclosure.

Please refer to FIG. 1, which illustrates a functional block diagram of a classification model creating system about a hard disk efficiency problem according to one embodiment of the present disclosure. As illustrated in FIG. 1, the classification model creating system 1 about the hard disk efficiency problem includes vibration parameter sensors 11 and an analyzing device 12 connected to these vibration parameter sensors 11.

Hard disk devices as follows are referred as hard disk devices loaded in a server. One server may load a plenty of hard disk devices, and may load four hard disk devices, eight hard disk devices or twelve hard disk devices according to its capacity. Said vibration parameter sensors 11 are configured to measure the values of the vibration parameters of each of the hard disk devices. Specifically, the vibration parameter sensors 11 may include at least two of a 3-axis accelerometer 111, a sound pressure meter 112 and a resonance frequency spectrum analyzer 113. The 3-axis accelerometer 111 is configured to measure values of acceleration and values of angular acceleration of the hard disk devices. The sound pressure meter 112 is configured to measure values of sound pressure of the hard disk devices. The resonance frequency spectrum analyzer 113 may be implemented by a hard disk I/O efficiency evaluation tool (IO meter) or a frequency spectrum analyzer, and is configured to analyze values of resonance frequency of the hard disk devices. Namely, said vibration parameters may include at least two of the acceleration, the angular acceleration, the sound pressure and the resonance frequency.

The analyzing device 12 may be a microcontroller, a graphics processing unit or the other electronic devices with functions of processing and storing data, but is not limited thereto. The analyzing device 12 is configured to obtain the pieces of the measurement data of the hard disk devices, wherein each of the pieces of the measurement data includes the values of the vibration parameters corresponding to a respective one of the hard disk devices. The values of the vibration parameters corresponding to a respective one of the hard disk devices are the values of the vibration parameters measured by said vibration parameter sensors 11. The analyzing device 12 discretizes pieces of measurement data based on a k-means algorithm, and obtains the classification model about the hard disk efficiency problem based on the pieces of discretized measurement data and a decision tree algorithm.

In one embodied aspect, the vibration parameter sensors 11 and the analyzing device 12 are integrated into one electronic apparatus. In another embodied aspect, the vibration parameter sensors 11 and the analyzing device 12 are independently disposed, and the analyzing device 12 is disposed on edge or cloud and is communicatively connected to said vibration parameter sensors 11.

Figure 2:
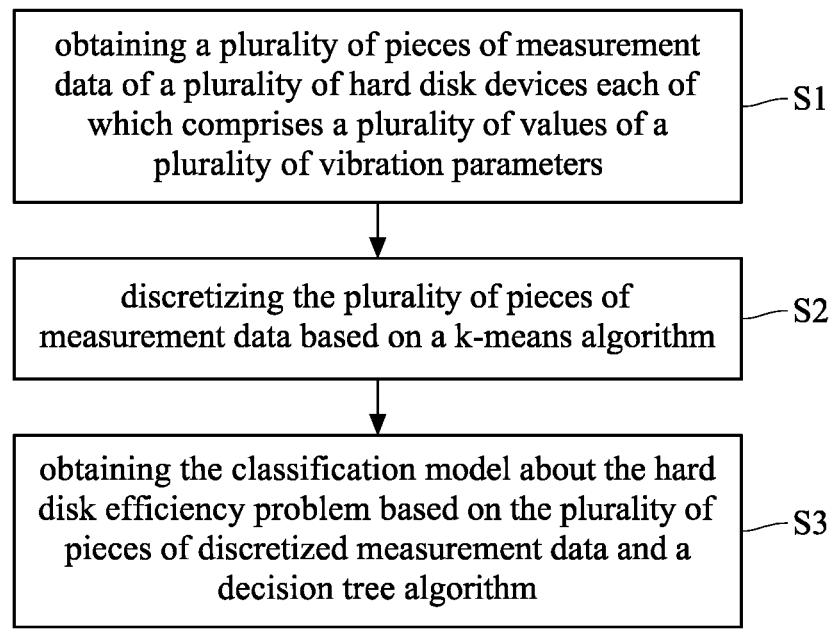
FIG. 2 illustrates a flowchart of a creating method of a classification model about a hard disk efficiency problem according to one embodiment of the present disclosure.

Please refer to FIG. 1 and FIG. 2, wherein FIG. 2 illustrates a flowchart of a creating method of a classification model about a hard disk efficiency problem according to one embodiment of the present disclosure. As illustrated in FIG. 2, the creating method of the classification model about the hard disk efficiency problem includes step S1~step S3. The creating method of the classification model about the hard disk efficiency problem shown in FIG. 2 may be applicable to the classification model creating system 1 about the hard disk efficiency problem shown in FIG. 1. For example, the step S1~step S3 would be explained by the operation of the classification model creating system 1 about the hard disk efficiency problem shown in FIG. 1 as follows.

Step S1: obtaining the pieces of the measurement data of the hard disk devices each of which includes values of vibration parameters by the analyzing device 12. As described above, the analyzing device 12 obtains the values of the vibration parameters from the vibration parameter sensors 11 which perform the measuring process on each of the hard disk devices. In one embodied aspect, the analyzing device 12 may control said vibration parameter sensors 11 to perform the measuring process on each of the hard disk devices and to transmit measuring results back to the analyzing device 12. In another aspect, said vibration parameter sensors 11 may be controlled by a user or other control devices to perform the measuring process on each of the hard disk devices and to transmit measuring results to the analyzing device 12.

Specifically, the 3-axis accelerometer 111 may be controlled to detect the values of the acceleration and the values of the angular acceleration on x-axis direction, y-axis direction and z-axis direction of each of the hard disk devices, specially the values of the acceleration on the x-axis direction and the values of the angular acceleration on the z-axis direction, and transmits the measuring results to the analyzing device 12. For example, the structure of the hard disk device may be a rectangular parallelepiped, the x-axis direction is parallel to the short side direction of the rectangular parallelepiped, the y-axis direction is parallel to the long side direction of the rectangular parallelepiped and the z-axis direction is parallel to the height direction of the rectangular parallelepiped, but the structure of the hard disk device is not limited thereto. The sound pressure meter 112 may be controlled to detect the value of the sound pressure of each of the hard disk devices, specially the values of the sound pressure when the hard disk devices work full-time, and transmit detection results to the analyzing device 12. The resonance frequency spectrum analyzer 113 may be controlled to perform the frequency scanning process on each of the hard disk devices, wherein frequency scanning range is 50 Hz~2000 Hz, for example. Or, the user may set the values of the resonance frequency as 300 Hz or 900 Hz by the user interface connected to the analyzing device 12.

Step S2: discretizing the pieces of the measurement data based on the k-means algorithm by the analyzing device 12. Specifically, the analyzing device 12 utilizes the k-means algorithm to discretize the values of the different vibration parameters to divide them into a plenty of groups. For example, the k-means algorithm is represented as follows:

$$b_i^n \begin{cases} 1, & x^n \text{approaches } c^i \\ 0, & \text{others} \end{cases}$$

updating all $$c^i, c^i = \frac{\sum_x^n b_i^n x^n}{\sum_x^n b_i^n}$$

wherein $b_i^n$ is the result of determining whether the measurement data belongs to the $i^{th}$ group, $c^i$ is the center of the $i^{th}$ group, $x^n$ is the $i^{th}$ measurement data. Specially, the value of i may be set as 4.

Step S3: obtaining the classification model about the hard disk efficiency problem based on the pieces of the discretized measurement data and a decision tree algorithm by the analyzing device 12. Specifically, the decision tree algorithm performed by the analyzing device 12 may utilize one or both of cross entropy and information gain as an indicator of the importance of features. In addition, the analyzing device 12 may receive a main feature that affects the hard disk significantly given by professionals from the outside through, for example, a user interface and a communication interface. In one embodied aspect, the analyzing device 12 utilizes the decision tree algorithm to perform a dichotomy on the pieces of the discretized measurement data to create a decision tree, performs a validation verification process on the decision tree to ensure that the model of the decision tree has a great learning ability, and serves the verified decision tree as the classification model about the hard disk efficiency problem. In another embodied aspect, obtaining the classification model about the hard disk efficiency problem performed by the analyzing device 12 includes performing a k-fold cross validation. Specifically, the analyzing device 12 divides all of the discretized measurement data into k sub-sets, and utilizes each of the k sub-sets in turn as an verification sub-set and utilizes the others as the training subsets, wherein k is 8 specially.

Figure 3:
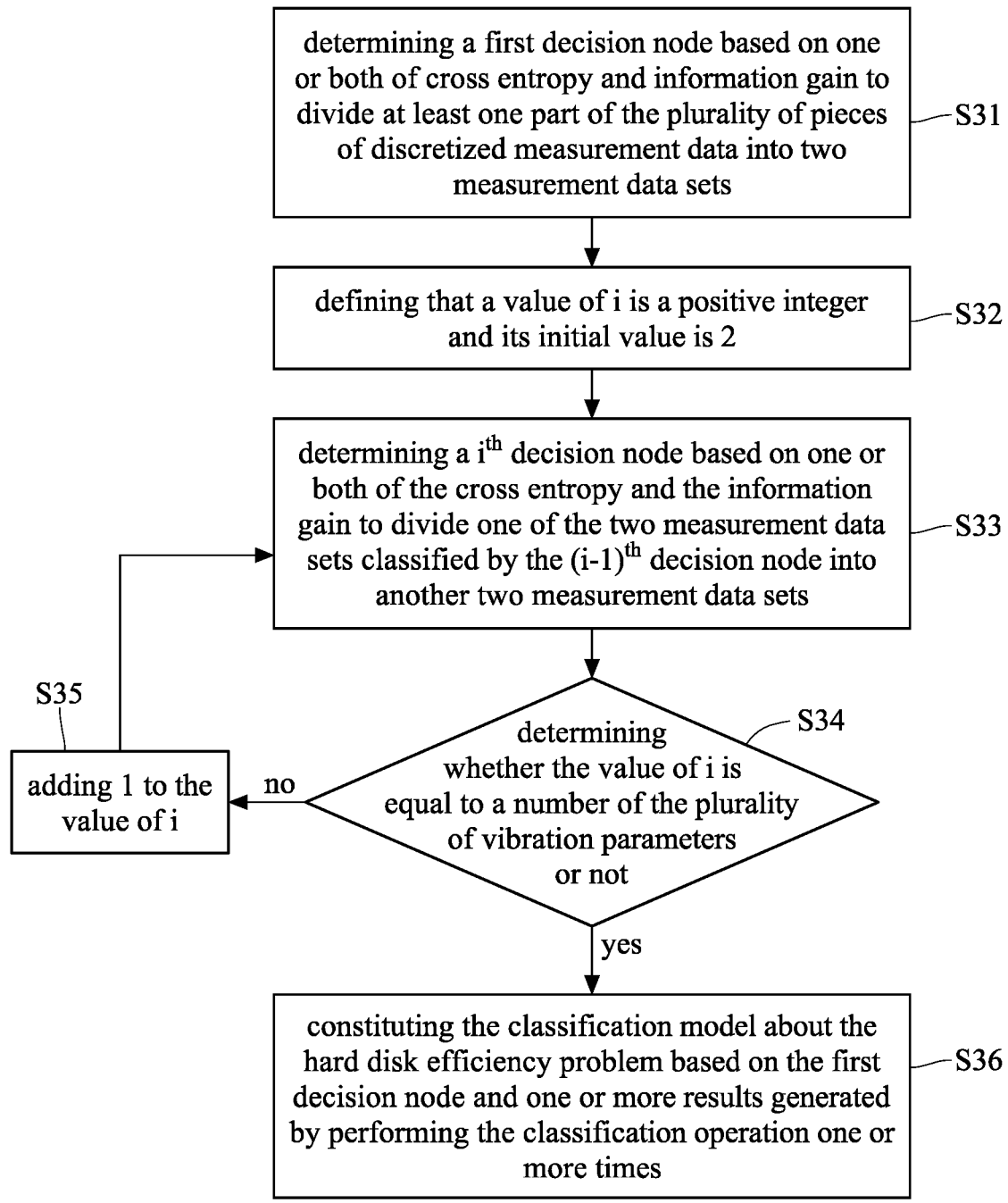
FIG. 3 illustrates a flowchart of detailed steps of obtaining the classification model about the hard disk efficiency problem according to one embodiment of the present disclosure.

For example, step S3 of performing decision tree algorithm would be explained as follows. Please refer to FIG. 1 and FIG. 3, wherein FIG. 3 illustrates a flowchart of detailed steps of obtaining the classification model about the hard disk efficiency problem according to one embodiment of the present disclosure. As illustrated in FIG. 3, step S3 may include step S31~step S36 and step S31~step S36 are performed by the analyzing device 12.

Step S31: determining a first decision node based on one or both of the cross entropy and the information gain to divide at least one part of the pieces of the discretized measurement data into two measurement data sets, wherein the first decision node is associated with one of the vibration parameters. The data population divided by the first decision node may be all of the discretized measurement data, or the (k−1)th sub-set of the divided and discretized k sub-sets with the discretized measurement data. The calculation formula and the determining threshold of the cross entropy and the information gain may be designed according to the actual requirement, the present disclosure is not limited thereto.

Step S32: defining that a value of i is a positive integer and its initial value is 2.

Step S33: determining the $i^{th}$ decision node based on one or both of the cross entropy and the information gain to divide one of the two measurement data sets classified by the $(i-1)^{th}$ decision node into another two measurement data sets, wherein the $i^{th}$ decision node is associated with another one of the vibration parameters.

Step S34: determining whether the value of i is equal to a number of the vibration parameters or not, wherein the number of the vibration parameters is greater than or equal to 2. If it is determined that the value of i is not equal to the number of the vibration parameters, performing step S35: adding 1 to the value of i, and performing step S33 again; if it is determined that the value of i is equal to the number of the vibration parameters, performing step S36: constituting the classification model about the hard disk efficiency problem based on the first decision node and one or more results generated by performing the classification operation one or more times.

Figure 4:
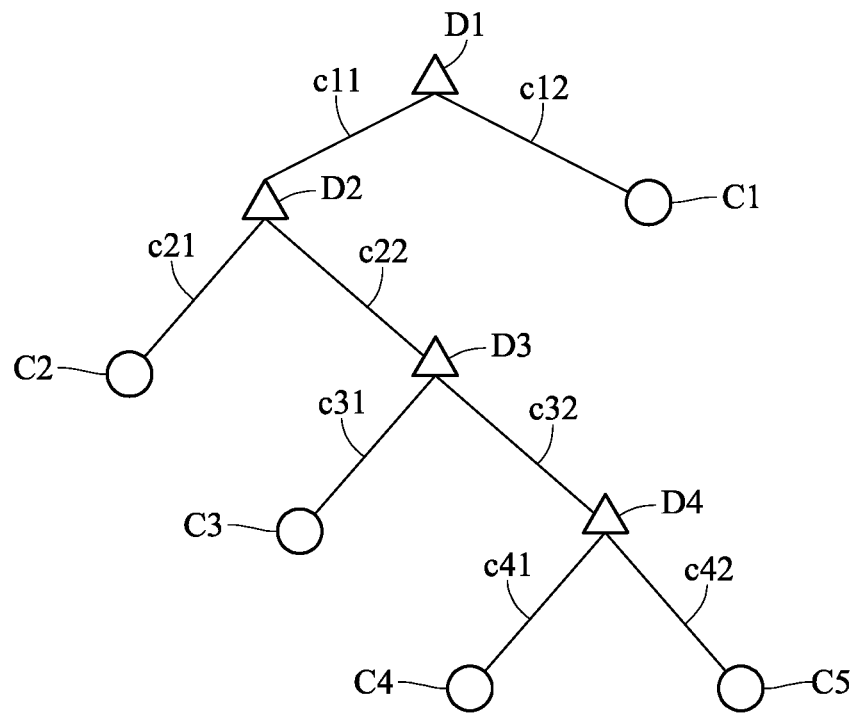
FIG. 4 illustrates a binary tree diagram of a decision tree algorithm according to one embodiment of the present disclosure.

Please refer to FIG. 1 and FIG. 4, wherein FIG. 4 illustrates a binary tree diagram of a decision tree algorithm according to one embodiment of the present disclosure. The analyzing device 12 may utilize said method of the aforementioned embodiment to create the decision tree as illustrated in FIG. 4 as the classification model about the hard disk efficiency problem, wherein the number of the vibration parameters is 4. The decision tree may include the first decision node D1 to the fourth decision node D4 and classes C1 to C5, wherein the first decision node D1 to the fourth decision node D4 are respectively associated with the different vibration parameters, and the classes C1~C4 are respectively associated with the vibration parameters same as the first decision node D1 to the fourth decision node D, and the class C5 is unrelated to any one of said four vibration parameters. Specifically, each of the first decision node D1 to the fourth decision node D4 performs a classification process on the data by the condition associated with the corresponding vibration parameter, wherein said condition indicates probability range that the corresponding vibration parameter would be a main reason of lowering the hard disk efficiency. The decision tree illustrated in FIG. 4 is just an example of decision tree node distribution, and the decision tree with different decision tree node distribution may be generated according to the training data in theory.

For example, the first decision node D1 to the fourth decision node D4 are respectively associated with the resonance frequency, the sound pressure, the acceleration and the angular acceleration; the first decision node D1 classifies the data as the second decision node D2 or the class C1 by a classification condition c11 "the probability range that the resonance frequency would be a main reason of lowering the hard disk efficiency is less than 0.5" and a classification condition c12 "the probability range that the resonance frequency would be a main reason of lowering the hard disk efficiency is more than or equal to 0.5", wherein the class C1 indicates that the main reason of lowering the hard disk efficiency is the frequency problem; the second decision node D2 classifies the data as the third decision node D3 or the class C2 by a classification condition c21 "the probability range that the sound pressure would be a main reason of lowering the hard disk efficiency is less than 0.5" and a classification condition c22 "the probability range that the sound pressure would be a main reason of lowering the hard disk efficiency is more than or equal to 0.5", wherein the class C2 indicates that the main reason of lowering the hard disk efficiency is the sound pressure problem; the third decision node D3 classifies the data as the fourth decision node D4 or the class C3 by a classification condition c31 "the probability range that the acceleration would be a main reason of lowering the hard disk efficiency is less than 0.5" and a classification condition c32 "the probability range that the acceleration would be a main reason of lowering the hard disk efficiency is more than or equal to 0.5", wherein the class C3 indicates that the main reason of lowering the hard disk efficiency is the acceleration problem; the fourth decision node D4 classifies the data as the class C4 or the class C5 by a classification condition c41 "the probability range that the angular acceleration would be a main reason of lowering the hard disk efficiency is less than 0.5" and a classification condition c42 "the probability range that the angular acceleration would be a main reason of lowering the hard disk efficiency is more than or equal to 0.5", wherein the class C4 indicates that the main reason of lowering the hard disk efficiency is the rotation problem, and the class C5 indicates that the main reason of lowering the hard disk efficiency is unrelated to the frequency problem, the sound pressure problem, the acceleration problem and the angular acceleration problem.

Figure 5:
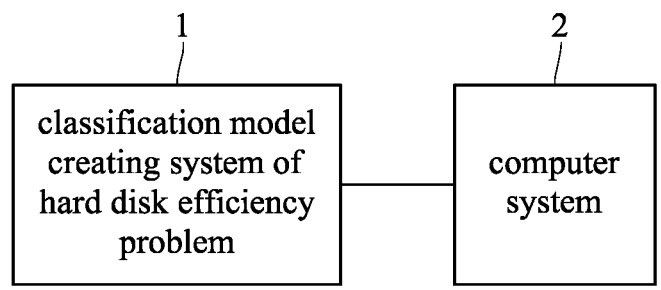
FIG. 5 illustrates a schematic diagram of performing environment of an analysis method of a hard disk efficiency problem according to one embodiment of the present disclosure.
Figure 6:
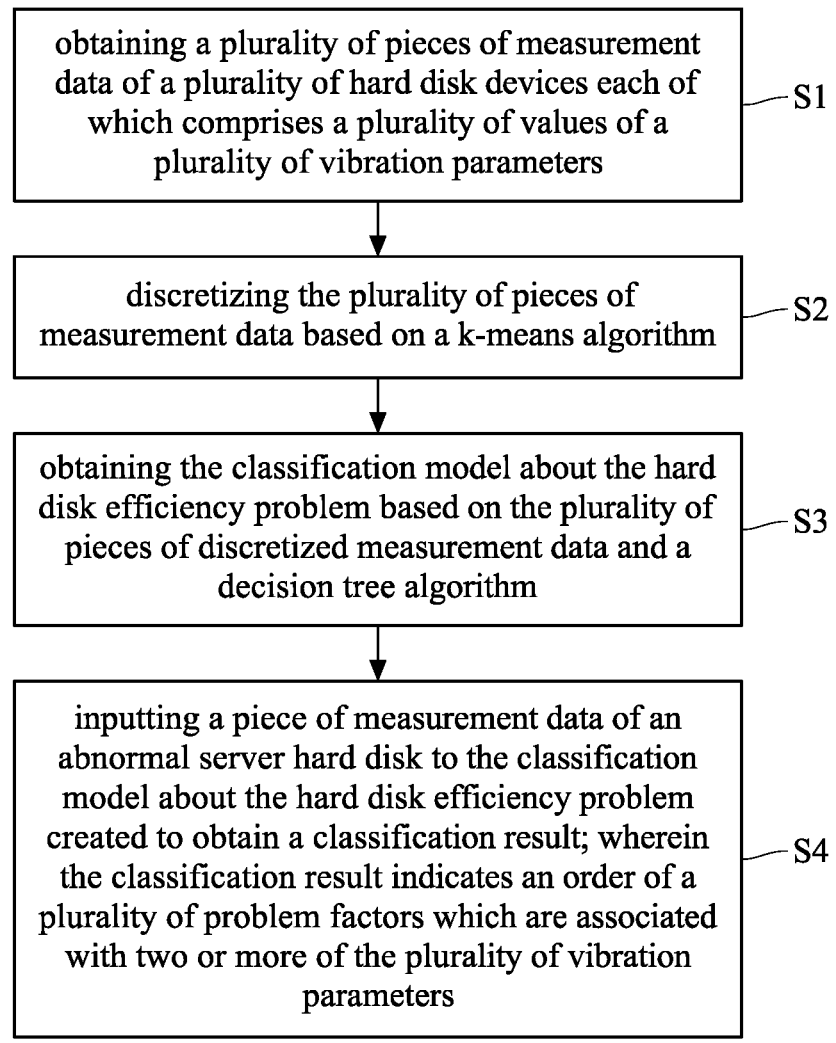
FIG. 6 illustrates a flowchart of an analysis method of a hard disk efficiency problem according to one embodiment of the present disclosure.

Please refer to FIG. 5 and FIG. 6, which illustrate a schematic diagram of performing environment of an analysis method of a hard disk efficiency problem according to one embodiment of the present disclosure and a flowchart of an analysis method of a hard disk efficiency problem according to one embodiment of the present disclosure. As illustrated in FIG. 5, the performing environment corresponding to the analysis method of the hard disk efficiency problem may include the classification model creating system 1 about the hard disk efficiency problem and a computer system 2, wherein the computer system 2 may be communicatively connected to the classification model creating system 1 about the hard disk efficiency problem. The classification model creating system 1 about the hard disk efficiency problem may provide the classification model about the hard disk efficiency problem as illustrated in FIG. 1, and the related details thereof are described in the aforementioned paragraphs and are not described again. The computer system 2 includes a processor which may obtain the classification model about the hard disk efficiency problem from the classification model creating system 1 about the hard disk efficiency problem, and input a piece of measurement data of an abnormal server hard disk to the classification model about the hard disk efficiency problem to obtain a classification result. The processor is a microcontroller, a graphics processing unit or other electronic devices with functions of processing and storing data, but is not limited thereto. In the present embodiment, the computer system 2 which performs the classification model about the hard disk efficiency problem and the analyzing device which creates the classification model about the hard disk efficiency problem are different devices. In another embodiment, the computer system 2 which performs the classification model about the hard disk efficiency problem and the analyzing device which creates the classification model about the hard disk efficiency problem are the same device.

As illustrated in FIG. 6, the analysis method of a hard disk efficiency problem may include step S1 to step S4. Step S1 to step S3 are steps of creating the classification model about the hard disk efficiency problem as described in FIG. 2 and are not described again. Step S4: inputting, by a computer system 2, the piece of measurement data of the abnormal server hard disk to the classification model about the hard disk efficiency problem to obtain a classification result, wherein the classification result indicates an order of problem factors which are associated with two or more of the vibration parameters. The problem factors may include the frequency problem, the sound pressure problem, the acceleration problem and the angular acceleration problem. Specifically, the computer system 2 may obtain the piece of measurement data of the abnormal server hard disk by the user interface or a server hard disk measurement device, and utilize the classification model about the hard disk efficiency problem to arrange the problem factors in the order of degrees of affecting the hard disk efficiency according to the piece of measurement data of the abnormal server hard disk.

For example, the server has many hard disk bays, such as 12 hard disk bays. The hard disks connected to 4 hard disk bays of the 12 hard disk bays are abnormal (for example, poor performance), and first measurement data, second measurement data, third measurement data, fourth measurement data are generated as shown in Table 1 by performing the measurement process on the hard disks. The computer system 2 obtains the first measurement data to the fourth measurement data by the user interface or the server hard disk measurement device and inputs the first measurement data to the fourth measurement data to the classification model about the hard disk efficiency problem to obtain the classification results as shown in Table 2.

TABLE 1

|  | acceleration $(m/s^2)$ | sound pressure (dB) | angular acceleration $(rad/s^2)$ | frequency (Hz) |
| --- | --- | --- | --- | --- |
| first measurement data | 0.05 | 93 | 14.26 | 300 |
| second measurement data | 0.008 | 98 | 9.56 | 300 |
| third measurement data | 0.14 | 99 | 11.22 | 300 |
| fourth measurement data | 0.24 | 108 | 14.6 | 360 |

TABLE 2

|  | order of the hard disk efficiency problem 1 | order of the hard disk efficiency problem 2 | order of the hard disk efficiency problem 3 |
| --- | --- | --- | --- |
| first measurement data | frequency | rotation | rotation |
| second measurement data | frequency | rotation | sound pressure |
| third measurement data | frequency | rotation | rotation |
| fourth measurement data | rotation | sound pressure | rotation |

In view of the above description, the creating method of the classification model about the hard disk efficiency problem and the classification model creating system about the hard disk efficiency problem disclosed by the present disclosure utilizes the k-means algorithm to discretize the pieces of the vibration measurement data of the hard disk devices, and combines the pieces of the discretized vibration measurement data and the decision tree algorithm to be able to create the decision tree with high classification accuracy as the classification model about the hard disk efficiency problem. And, because the pieces of the vibration measurement data of the hard disk devices serves as training data, the pruning need of the decision tree created by the present disclosure isn't high. In addition, the analysis method of the hard disk efficiency problem disclosed by the present disclosure inputs the piece of the measurement data of the abnormal hard disk inside the server and storage system to the aforementioned classification model about the hard disk efficiency problem and is able to determine the main reason of the low hard disk efficiency very well. In one embodiment of the present disclosure, the creating method of the classification model about the hard disk efficiency problem, the analysis method of the hard disk efficiency problem and the classification model creating system about the hard disk efficiency problem perform an analyzing test on the hard disks loaded on the server to increase the reliability of the server. The server is suitable for artificial intelligence computing and edge computing, and may also be served as a 5G server, a cloud server or an Internet of vehicle server.

What is claimed is:

1. A creating method of a classification model about a hard disk efficiency problem, comprising: by an analyzing device, performing:
    obtaining a plurality of pieces of measurement data of a plurality of hard disk devices each of which comprises a plurality of values of a plurality of vibration parameters;
    discretizing the plurality of pieces of measurement data based on a k-means algorithm; and
    obtaining the classification model about the hard disk efficiency problem based on the plurality of pieces of discretized measurement data and a decision tree algorithm;
    wherein obtaining the classification model about the hard disk efficiency problem based on the plurality of pieces of discretized measurement data and the decision tree algorithm comprises:
        determining a first decision node based on one or both of cross entropy and information gain to divide at least one part of the plurality of pieces of discretized measurement data into two measurement data sets, wherein the first decision node is associated with one of the plurality of vibration parameters;
        defining that a value of i is a positive integer and its initial value is 2 and performing a classification operation, with the classification operation comprising:
            determining a $i^{th}$ decision node based on one or both of the cross entropy and the information gain to divide one of the two measurement data sets classified by a $(i-1)^{th}$ decision node into another two measurement data sets, wherein the $i^{th}$ decision node is associated with another one of the plurality of vibration parameters;
            determining whether the value of i is equal to a number of the plurality of vibration parameters or not, wherein the number of the plurality of vibration parameters is greater than or equal to 2;
            if the value of i is not equal to the number of the plurality of vibration parameters, adding 1 to the value of i and performing the classification operation again; and
            if the value of i is equal to the number of the plurality of vibration parameters, constituting the classification model about the hard disk efficiency problem based on the first decision node and one or more results generated by performing the classification operation one or more times.

2. The creating method of the classification model about the hard disk efficiency problem according to claim 1, wherein the decision tree algorithm is ID3 algorithm.

3. An analysis method of a hard disk efficiency problem comprising performing by a computer system:
    inputting, by a computer system, a piece of measurement data of an abnormal server hard disk to the classification model about the hard disk efficiency problem created by the creating method according to claim 2 to obtain a classification result;
    wherein the classification result indicates an order of a plurality of problem factors which are associated with two or more of the plurality of vibration parameters.

4. The creating method of the classification model about the hard disk efficiency problem according to claim 1, wherein the plurality of vibration parameters comprises two or more of acceleration, angular acceleration, sound pressure and resonance frequency.

5. An analysis method of a hard disk efficiency problem comprising performing by a computer system:
    inputting, by a computer system, a piece of measurement data of an abnormal server hard disk to the classification model about the hard disk efficiency problem created by the creating method according to claim 4 to obtain a classification result;
    wherein the classification result indicates an order of a plurality of problem factors which are associated with two or more of the plurality of vibration parameters.

6. The creating method of the classification model about the hard disk efficiency problem according to claim 1, wherein obtaining the classification model about the hard disk efficiency problem based on the plurality of pieces of discretized measurement data and the decision tree algorithm comprises performing a k-fold cross validation.

7. An analysis method of a hard disk efficiency problem comprising performing by a computer system:
    inputting, by a computer system, a piece of measurement data of an abnormal server hard disk to the classification model about the hard disk efficiency problem created by the creating method according to claim 6 to obtain a classification result;
    wherein the classification result indicates an order of a plurality of problem factors which are associated with two or more of the plurality of vibration parameters.

8. An analysis method of a hard disk efficiency problem comprising performing by a computer system:
    inputting, by a computer system, a piece of measurement data of an abnormal server hard disk to the classification model about the hard disk efficiency problem created by the creating method according to claim 1 to obtain a classification result;
    wherein the classification result indicates an order of a plurality of problem factors which are associated with two or more of the plurality of vibration parameters.

9. A classification model creating system of a hard disk efficiency problem, comprising:
    a plurality of vibration parameter sensors configured to measure values of a plurality of vibration parameters of each of a plurality of hard disk devices; and
    an analyzing device connected to the plurality of vibration parameter sensors and configured to obtain a plurality of pieces of measurement data of the plurality of hard disk devices, discretize the plurality of pieces of measurement data based on a k-means algorithm, and obtain a classification model about the hard disk efficiency problem based on the plurality of pieces of discretized measurement data and a decision tree algorithm, wherein each of the plurality of pieces of measurement data comprises the values of the plurality of vibration parameters corresponding to a respective one of the plurality of hard disk devices;

wherein obtaining the classification model about the hard disk efficiency problem based on the plurality of pieces of discretized measurement data and the decision tree algorithm comprises:
- determining a first decision node based on one or both of cross entropy and information gain to divide at least one part of the plurality of pieces of discretized measurement data into two measurement data sets, wherein the first decision node is associated with one of the plurality of vibration parameters;
- defining that a value of i is a positive integer and its initial value is 2 and performing a classification operation, with the classification operation comprising:
  - determining a $i^{th}$ decision node based on one or both of the cross entropy and the information gain to divide one of the two measurement data sets classified by a $(i-1)^{th}$ decision node into another two measurement data sets, wherein the $i^{th}$ decision node is associated with another one of the plurality of vibration parameters;
  - determining whether the value of i is equal to a number of the plurality of vibration parameters or not, wherein the number of the plurality of vibration parameters is greater than or equal to 2;
  - if the value of i is not equal to the number of the plurality of vibration parameters, adding 1 to the value of i and performing the classification operation again; and
  - if the value of i is equal to the number of the plurality of vibration parameters, constituting the classification model about the hard disk efficiency problem based on the first decision node and one or more results generated by performing the classification operation one or more times.

10. The classification model creating system of the hard disk efficiency problem according to claim 9, wherein the decision tree algorithm is ID3 algorithm.

11. The classification model creating system of the hard disk efficiency problem according to claim 9, wherein the plurality of vibration parameter sensors comprises a 3-axis accelerometer, a sound pressure meter and a resonance frequency spectrum analyzer, with the 3-axis accelerometer.

* * * * *